June 11, 1957
G. L. OSWALT
2,795,311
PALLET FEEDER

Filed March 4, 1954
8 Sheets-Sheet 1

Inventor
George L. Oswalt
by Parker & Carter
Attorneys

Inventor
George L. Oswalt
by Parker & Carter
Attorneys

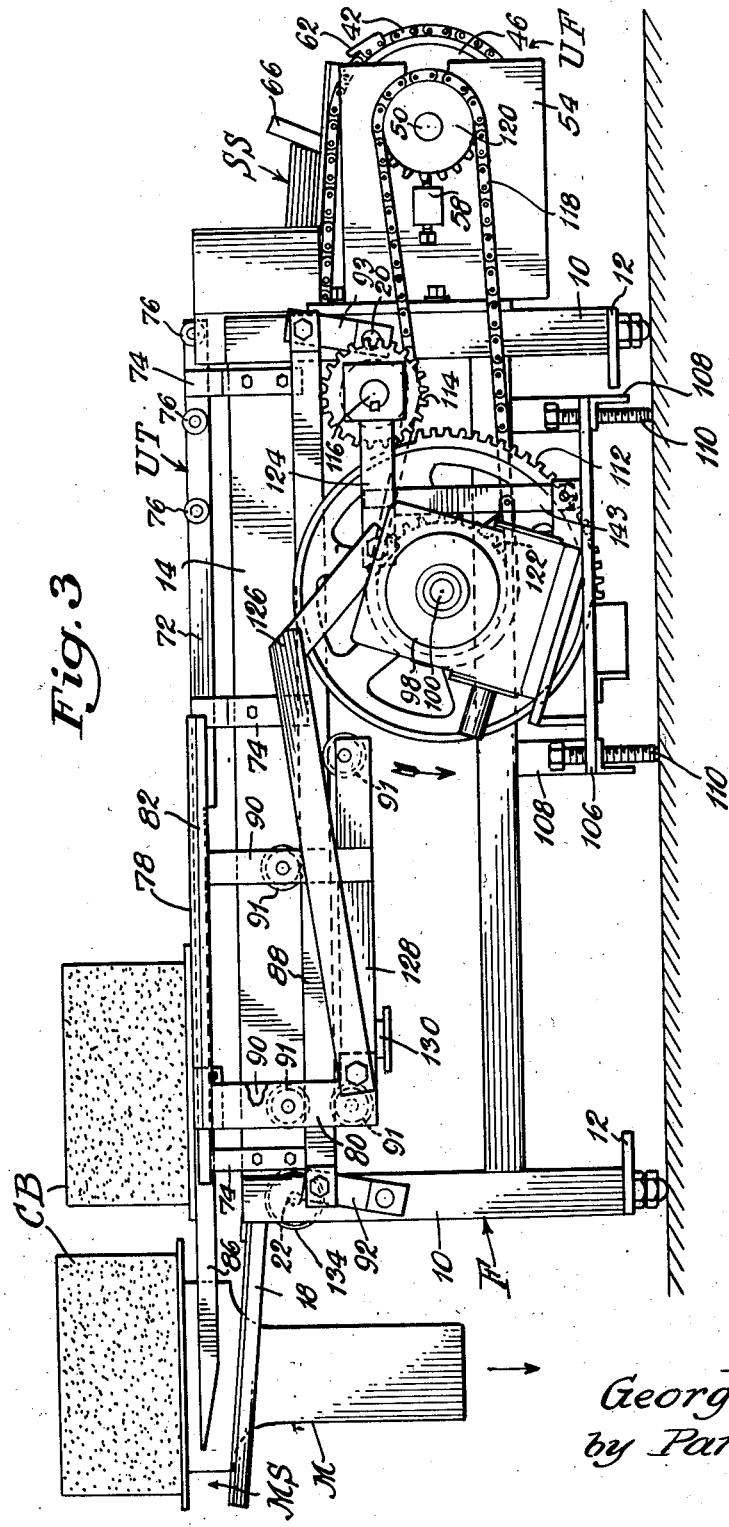

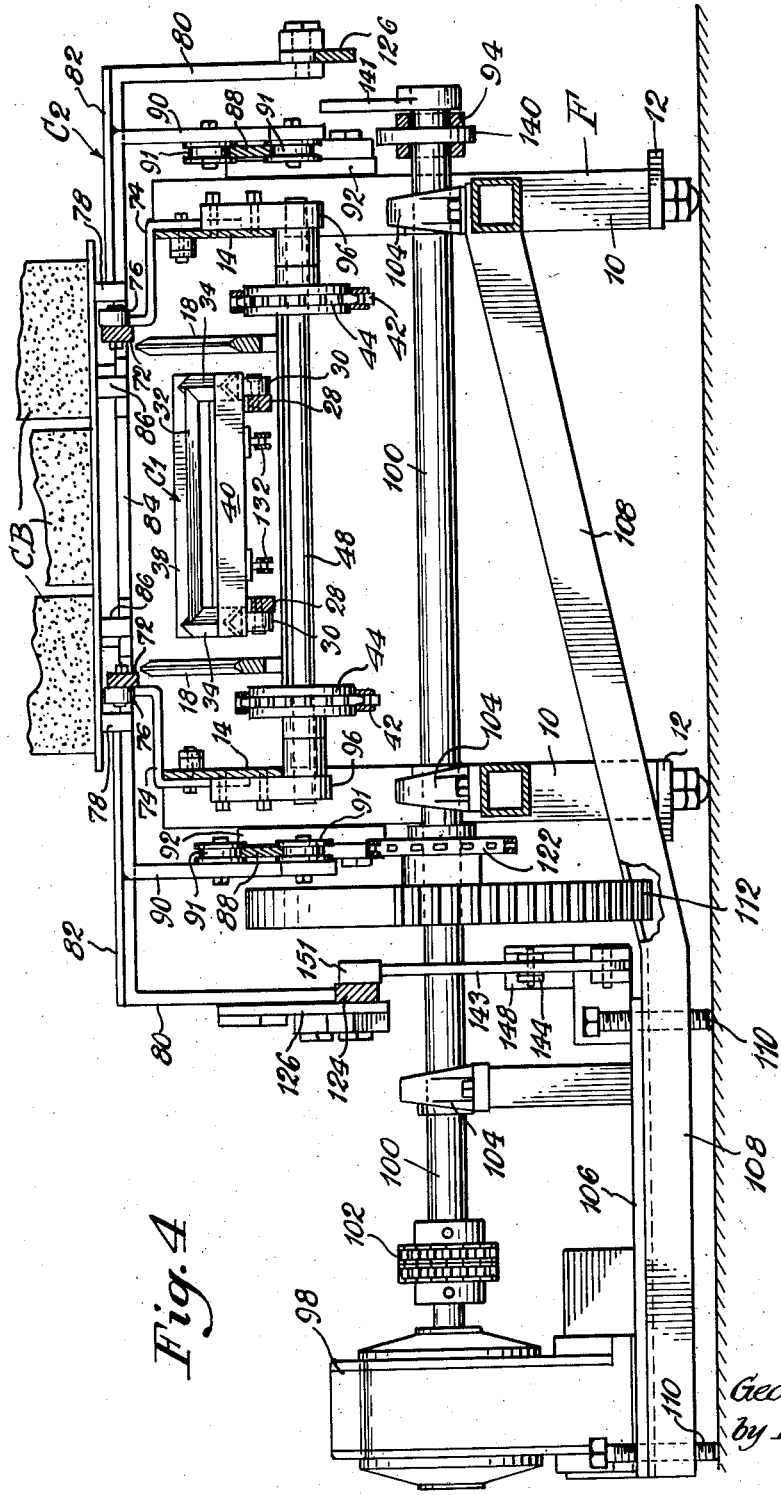

June 11, 1957  G. L. OSWALT  2,795,311
PALLET FEEDER
Filed March 4, 1954  8 Sheets-Sheet 5
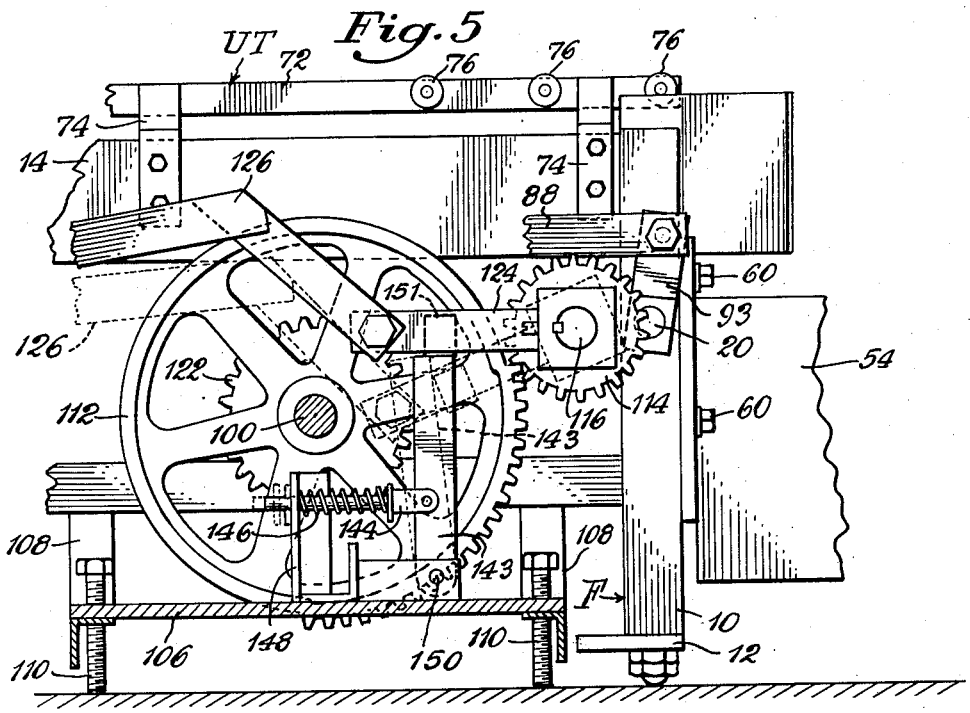
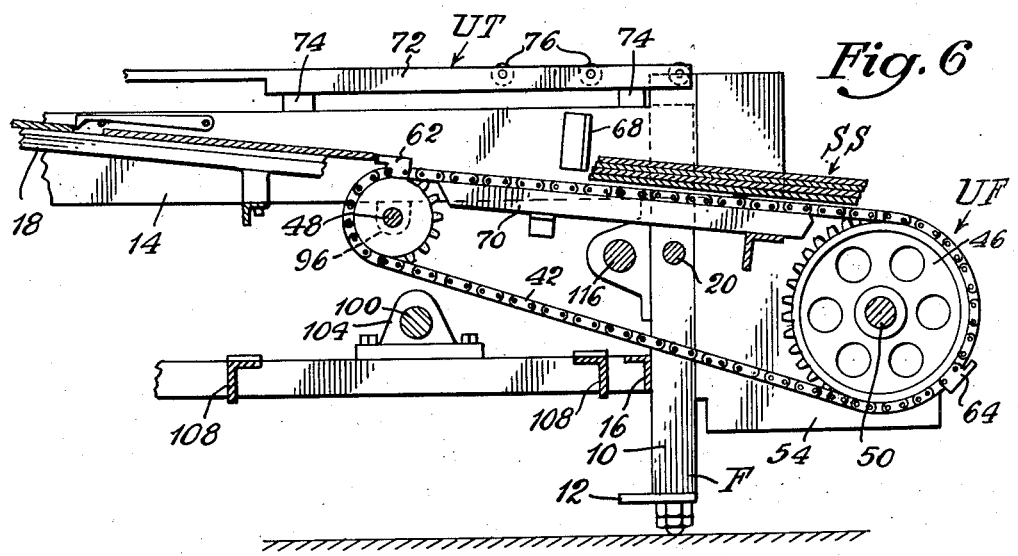
Inventor
George L. Oswalt
by Parker & Carter
Attorneys

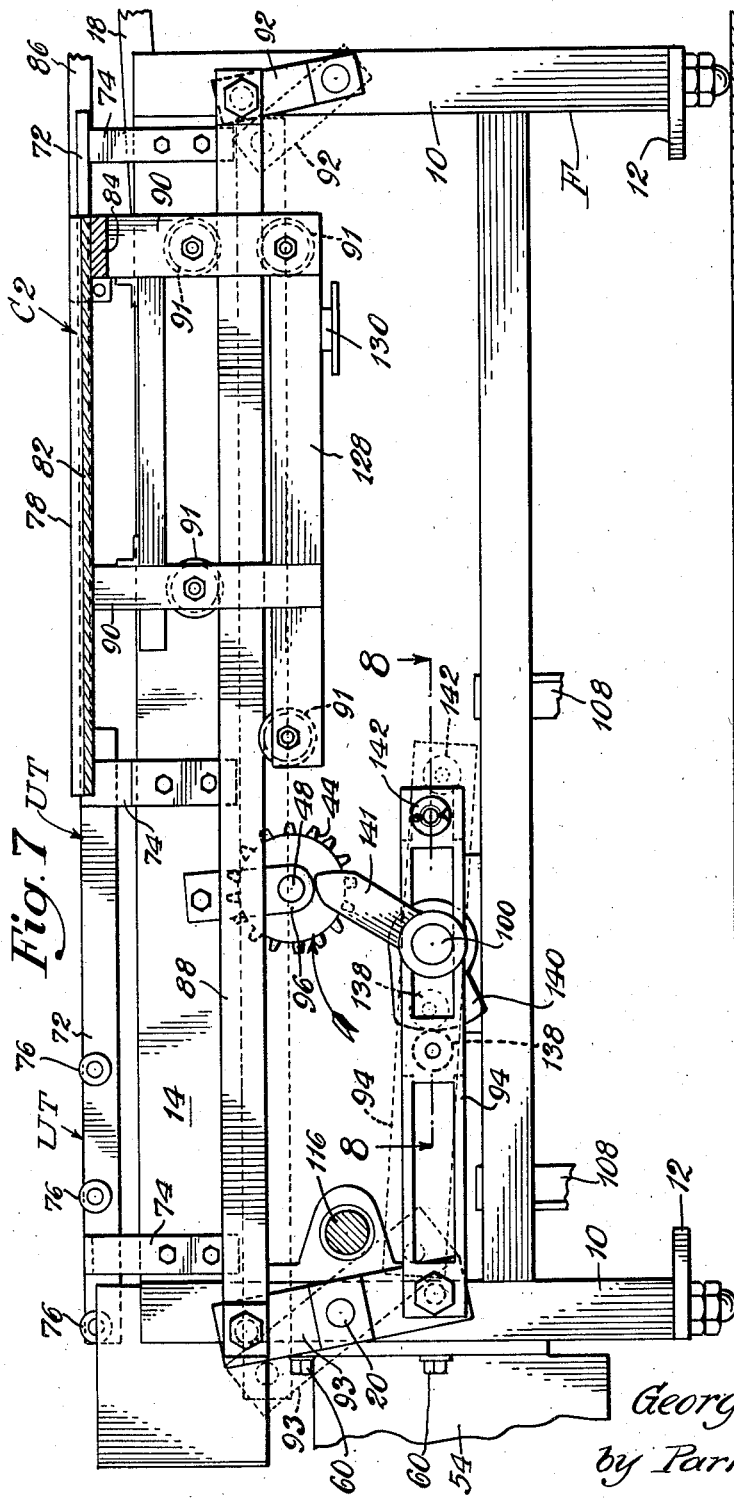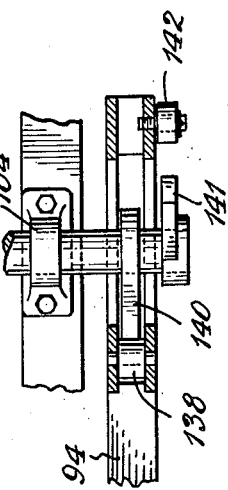

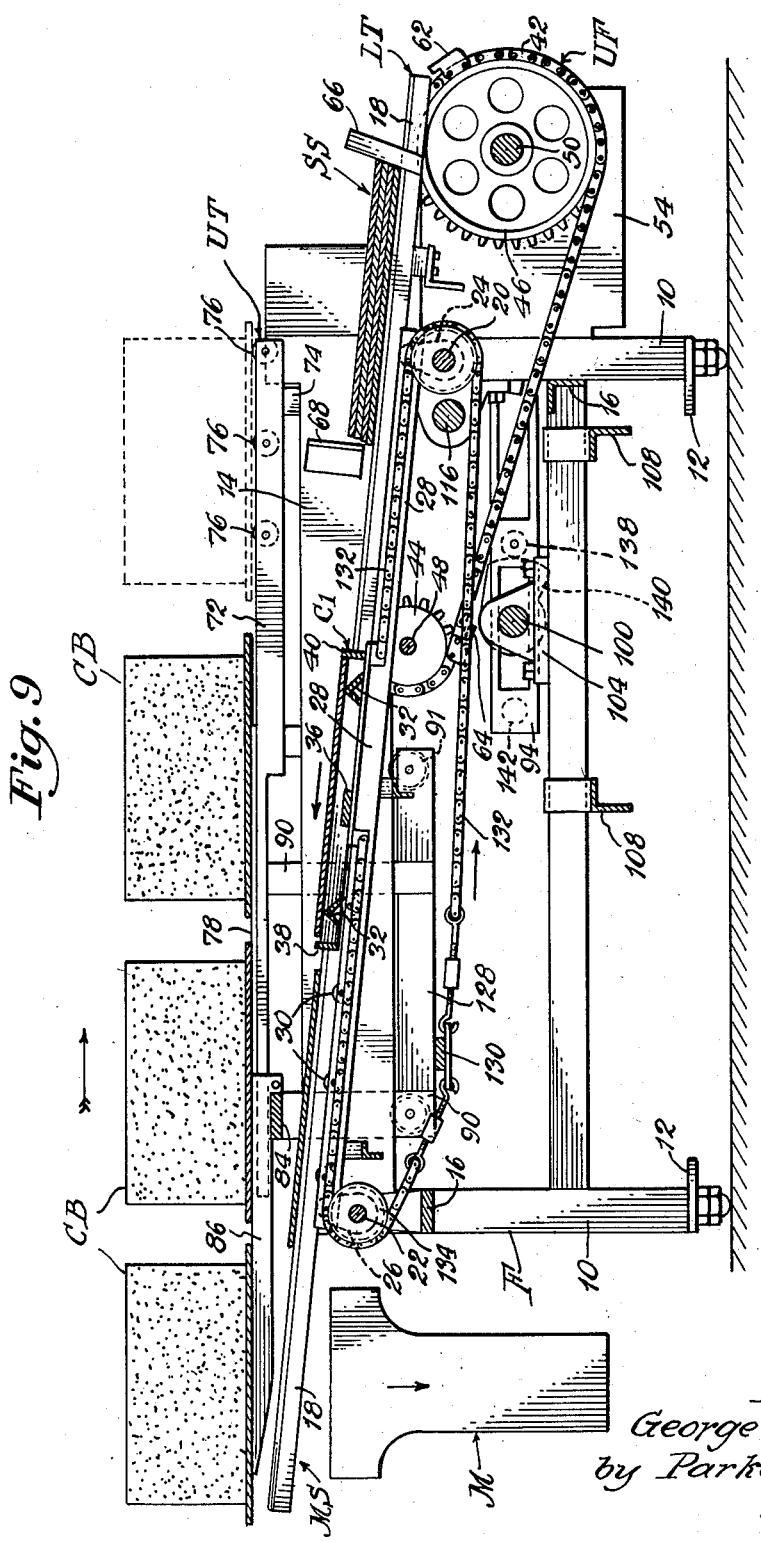

June 11, 1957 G. L. OSWALT 2,795,311
PALLET FEEDER
Filed March 4, 1954 8 Sheets-Sheet 8
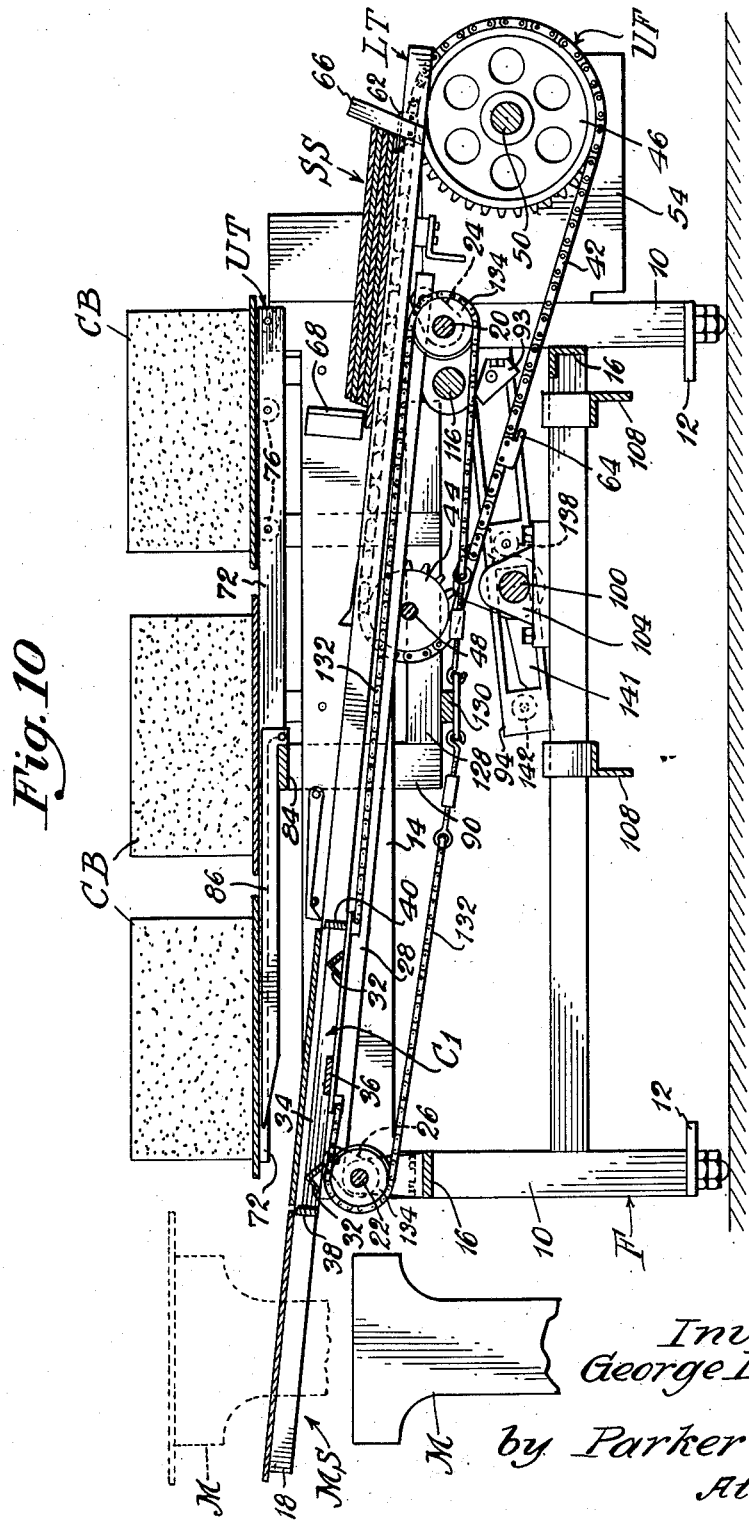
Inventor
George L. Oswalt
by Parker & Carter
Attorneys

United States Patent Office 2,795,311
Patented June 11, 1957

2,795,311

PALLET FEEDER

George L. Oswalt, Elmwood Park, Ill.

Application March 4, 1954, Serial No. 413,998

9 Claims. (Cl. 198—19)

My invention resides in the field of pallet-feeding machines or pallet-handling devices for conveying pallets both to and from molding machines. More specifically, my invention is a device for conveying empty pallets to a molding machine and carrying molded pallets from the machine, and has an improved pallet conveying mechanism, an improved unloading mechanism, and an improved drive mechanism.

The molded blocks formed by cinder or concrete block machines are rather fragile, and they require delicate handling to prevent them from collapsing. To date, the most efficient method for handling the green molded blocks during and after molding in the machine is to mold one or more blocks on a so-called pallet. A pallet is nothing more than a rectangular plate, generally made of metal such as steel or the like; however, conceivably they could be made of any suitable rigid material, such as wood, plastic, or the like. Generally, the molding machine forms a plurality of green blocks on each pallet. The pallets are fed from a supply stack to the machine and after the blocks are formed on each pallet, they are conveyed away from the machine. At this point, the pallets require careful handling because the blocks are still in a very fragile condition and they will collapse if subjected to excessive vibration or rough treatment.

Another important feature of a pallet-feeding machine is its speed of operation. It must be timed to the molding operations of the molding machine and for each cycle of operation of the molding machine, the feeding machine must feed in an empty pallet so that the new blocks can be formed on it, must convey away the loaded pallet with the previously formed blocks on it, and must not lurch during its operation so as to jolt the delicate green blocks.

Therefore, a primary object of my invention is a new and improved pallet feeder of the above generally described type for feeding empty and loaded pallets to and from a molding machine, the pallet feeder being synchronized with the operative cycle of the molding machine and being adapted to properly time the arrival of the empty pallets at the molding machine and to carefully handle the loaded pallets during their withdrawal from the molding machine.

Another object is a new and improved drive mechanism for a pallet feeder of the above generally described type adapted to prevent any jolting or lurching of the machine as it is either picking up or depositing the loaded pallets.

Other objects will appear from time to time in the ensuing specification and drawing in which:

Figure 3 is a side view of my pallet feeder showing the drive mechanism and the position of the various parts during an idle period of the pallet feeder;

Figure 4 is a front view of the end of the pallet feeder that extends away from the molding machine;

Figure 5 is a detailed view of the intermittent drive mechanism with parts broken away;

Figure 6 is a detailed view of a part of the auxiliary pallet-feeding mechanism for conveying empty pallets to a lower track;

Figure 7 is a side view, taken from the opposite side shown in Figure 3, showing a part of the carriage actuating mechanism;

Figure 8 is a sectional view taken along line 8—8 in Figure 7;

Figure 9 is a longitudinal sectional view of my pallet feeder, with parts broken away for clarity, showing both the upper and lower feeding carriages in their normal positions; and Figure 10 is a side sectional view similar to Figure 9 showing the extreme positions of the two carriages during a pallet-feeding operation.

Figure 1:
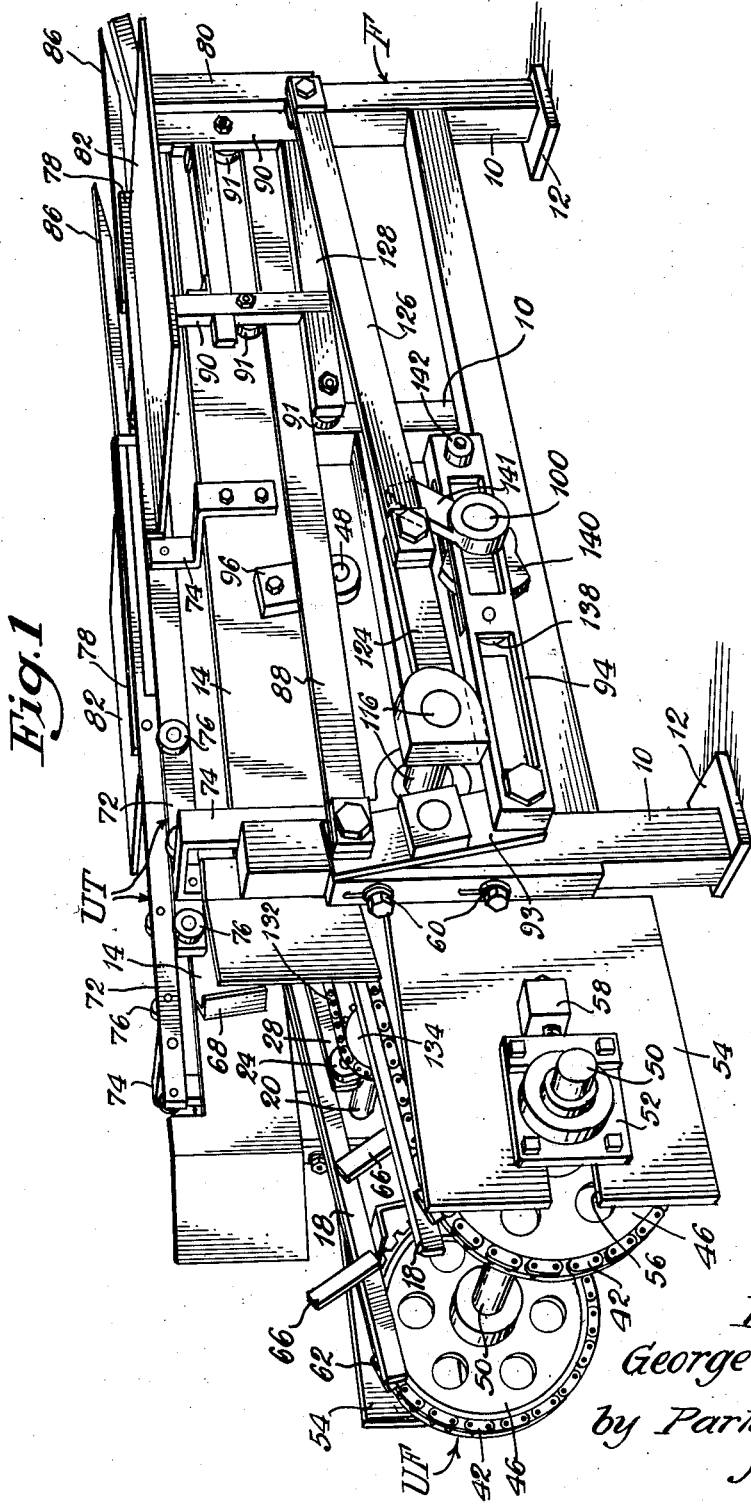
Figure 1 is a perspective view of my new and improved pallet feeder.
Figure 2:
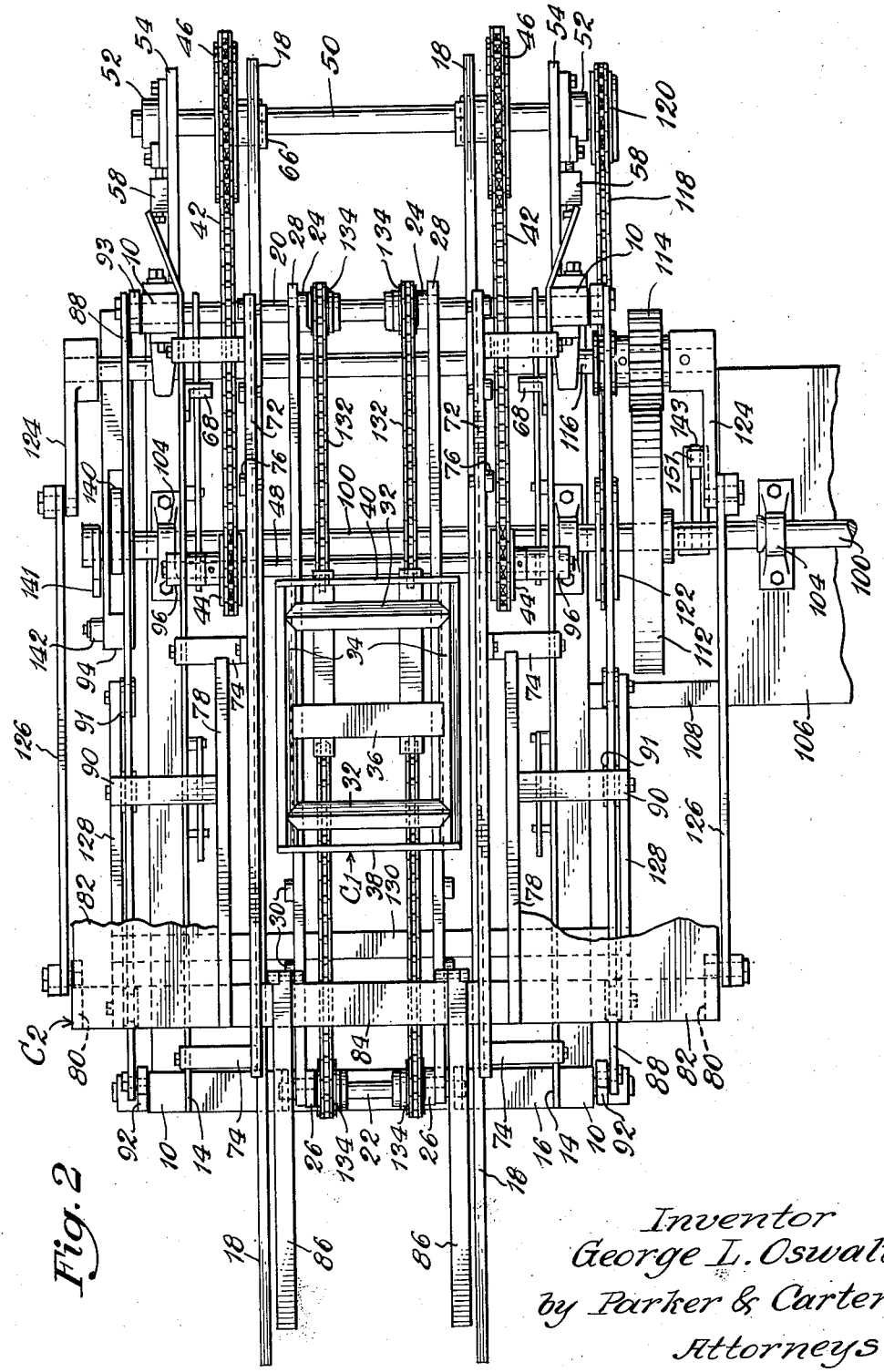
Figure 2 is a plan view of my new and improved pallet feeder.

My pallet feeder is composed primarily of the following main parts:

In Figure 1, the frame of the pallet feeder is indicated generally at F and includes at least four generally upright stanchions or legs 10. Each of the legs may have a flat supporting plate 12 secured to its lower end. In addition, any suitable adjusting device could be provided on each leg for adjusting their height, either individually or in unison. The legs are interconnected longitudinally by any suitable longitudinal guides or beams 14 and transversely by suitable angle irons and horizontal members 16. Any form of suitable reinforcing or bracing members may be interposed between the legs and the horizontal members to form a rigid framework.

As best shown in Figures 1, 9 and 10, a pair of tracks extend longitudinally along the upper portion of the framework, one track being superimposed above the other. The upper track UT is generally horizontal while the lower track LT is disposed at a slight angle with respect to the horizontal. Both tracks lead forwardly and converge generally toward the molding station MS which is the point of operation of the molding machine indicated at M.

The lower track LT conveys empty pallets from a supply stack SS horizontally and upwardly to the left in Figure 9 to the molding station MS. The upper track UT conveys loaded pallets with cinder block, generally indicated by CB horizontally away from the molding station MS toward the right, as shown in Figure 9, until at the right-hand extremity of the track, the loaded pallets are picked up by any suitable fork lift type mechanism, placed on a suitable truck or dolly and conveyed to a suitable kiln or oven.

Both tracks have stationary rails which are rigidly connected to the frame F. Both have a carriage adapted to move along the stationary rail and convey the pallets. Both have a suitable mechanism for raising the carriage slightly above the rails so as to pick up the pallets while the carriage is being moved toward the molding station, in the case of the lower track and away from the molding station, in the case of the upper track. The mechanism also lowers the carriage below the stationary rails while the carriage is being moved away from the molding machine, in the case of the lower track, and toward the molding station, in the case of the lower track.

Returning specifically to the lower track LT, a pair of stationary rails 18 are mounted on the frame and extend from the right-hand end of the frame, as shown in Figure 9, diagonally upwardly to the left end of the frame. Shafts 20 and 22 extend laterally across the frame and are pivotally mounted on it. The shafts carry levers 24 and 26 with longitudinal members 28 connected to their ends and extending between them. The members 28 carry suitable rollers 30 upon which a pallet carriage C1 is adapted to ride.

The shafts 20 and 22 at each end of the frame, with their respective levers 24 and 26 interconnected by the longitudinal members 28, constitute the raising and lowering mechanism for the pallet-feeding carriage C1. When this mechanism is raised, as shown in Figure 9, the carriage C1 will be slightly above the stationary rails 18, and the carriage may freely roll along the top of the rollers 30 without contacting the stationary rails. When the mechanism is lowered, as shown in Figure 10, the carriages will be below the stationary rails, and the carriage will no longer contact the pallets. The pallets extend laterally beyond both ends of the carriage C1, as shown in Figure 4, and when the carriage C1 moves below the stationary rails, the pallet will rest on the rails.

The carriage C1 is composed of a pair of cross supporting angle members 32 interconnecting side angle members 34 with a cross support or bracing strut 36. The ends of the carriage have forward and rearward members 38 and 40 which are raised slightly above the edges of the members 32, as shown in Figure 9. The rear member 40 is raised sufficiently so as to act as a picker and each pallet will not slide off of the rear edge of the carriage. As shown in Figure 9, a pallet will fit between the raised edges of the members 38 and 40.

The driving mechanism for the carriages and for the raising and lowering mechanisms will be explained later.

The lower track LT has an auxiliary feeding mechanism UF which is composed of a pair of chains 42 passing about forward and rearward sprockets 44 and 46. The forward sprockets are carried by a shaft 48 while the rearward sprockets 46 are on a shaft 50. Each shaft is suitably mounted in the bearings on the frame F. The rear shaft 50 is mounted in bearings 52, as shown in Figure 1, which are carried by extending side plates 54. Adjustment of the shaft is provided by suitable slots 56 in the plates, the bearings being engaged by an adjusting screw mechanism 58. The side plates 54 are adjustably connected to the legs 10 through a pair of slot connections 60, as shown in Figure 1, so that the end of the auxiliary feeding mechanism can be slightly raised or lowered. Note in Figure 1, that the stationary rails 18 extend the full length of the auxiliary feeding mechanism with the supply stack SS being positioned on the stationary rails directly above the auxiliary feeding mechanism.

Each of the chains carry suitable feeding lugs 62 and 64 in pairs, the lug 64 being displaced 180 degrees from the lug 62 with respect to their operative positions in the auxiliary feeding mechanism. As shown in the drawings, the lugs pass under the supply stack SS and picks off the bottom pallet. The pallets are confined between rearward braces 66 and forward stops 68 on each side of the frame. The forward stops 68 are positioned with respect to the stationary rails so that only one pallet can pass under them. This prevents the lower pallet from carrying another pallet with it due to their frictional engagement. A pair of support members 70, one for each chain, are positioned below the chains to prevent them from sagging between the sprockets.

The auxiliary feeding mechanism UF feeds the pallets one at a time from the supply stack SS forward to the position shown in Figure 6 where each pallet is picked up in turn by the carriage C1 and carried forwardly to the position in which the carriage is shown in Figure 10. The pallet at the molding station in Figure 10 has been pushed there from the position of the carriage in Figure 10 by the forward movement of the carriage as it brings the next pallet forward.

The actuating or drive mechanism for the auxiliary feeding mechanism will be described later.

The upper track UT has a pair of stationary rails 72 which are connected to the side frame or guide members 14 by suitable brackets 74. Each of the rails carries rollers 76 so that the loaded pallets will move easily along them.

An upper carriage C2 is composed generally of a pair of movable rails 78 disposed on each side and just outside of the stationary rails 72. The movable rails each carrying two or more members 80 which extend outwardly to the driving mechanism to be described herein below. These members each carry horizontally disposed plate 82 so that, if one or more of the green blocks should break and collapse as they are being brought out of the molding machine, the plates 82 on each side will prevent the majority of the crumbled material from falling into the mechanism of the pallet feeder.

The movable rails 78 are interconnected at their forward edge by a bar 84 which carries a pair of pivotally mounted lifting members 86. See Figure 3. As shown in Figures 9 and 10, these two lifting members are adapted to pivot only clockwise so that if they are accidently engaged by part of the molding mechanism during its upward movement, as shown in these figures, they will freely rotate clockwise. This prevents any damage to the pallet feeder. The lifting members are prevented from counterclockwise rotation by the bar 84 so that they will be rigid when they pick up the loaded pallet, as shown in Figure 9.

The carriage C2 is movably supported on each side of the frame by a rail 88. The carriage has a pair of downwardly extending members 90 which are suitably braced and interconnected and carry a collection of rollers 91 which are positioned both above and below the rails 88.

The rails 88 are mounted at their forward end on a pivoted lever 92 which is pivotally mounted on the frame, and at their rear end on an actuating lever 93 which is pivotally mounted on the frame. The opposite end of the lever 93 is connected to a cam follower mechanism 94 to be described more fully herein below. The actuating mechanism for the pallet feeder raises and lowers the rails 88. When the rails are in their full line position, as shown in Figure 7, this being the raised position, the carriage C2 will be above the stationary rails 72. When the rails are in their lower or dotted line position, the carriage will be below the stationary rails 72.

The longitudinal guiding members 14 carry an adjustable bearing 96, as shown in Figure 1, for the shaft 48.

The driving mechanism for the entire pallet feeder is as follows:

Any suitable power means, such as an electric motor of sufficient size, a separate gasoline engine, or the power mechanism for the molding machine, may be used to drive a speed reducer 98 which drives a main drive shaft 100 through a conventional coupling 102 shown in Figure 4.

The main drive shaft has a suitable number of bearings 104. The speed reducer is supported on an auxiliary platform 106 which is interconnected to the main frame F of the pallet feeder by any suitable mechanism composed of a collection of cross struts and braces 108. The auxiliary platform 106 may be adjusted as to height by a plurality of suitable bolts 110.

The main drive shaft 100 marries a mutilated gear 112 which engages a pinion 114 mounted on a secondary drive shaft 116. The main drive shaft 100 is continuously rotated by the driving means employed, but the secondary drive shaft 116 is only intermittently rotated through the mutilated gear and pinion connection.

The auxiliary feeding mechanism UF is also driven continuously because it is directly connected to the main drive shaft. A chain 118 passes around a pinion 120 on the shaft 50 and around a pinion 122 on the main drive shaft.

The lower feeding carriage C1 is intermittently driven from the secondary drive shaft 116 by the following mechanism:

The shaft 116 carries a pair of over-center levers 124, one on each side. These levers are connected by links 126 to members 80 that extend downwardly from the upper feeding carriage C2. As the shaft 116 is intermittently rotated, the over-centered cranks 124 will reciprocate the upper feeding carriage C2 back and forth.

The upper feeding carriage C2 has a cross frame structure, indicated generally at 128, which extends downwardly and across underneath the carriage approximately through the middle of the frame structure. This cross frame structure has a cross bar 130 which reciprocates back and forth with the carriage. A chain 132 is connected to the lower feeding carriage C1 and to the cross bar 130. The chain passes over the sprockets 134 which are loosely mounted on the shafts 20 and 22 on the frame. Thus, when the upper feeding carriage reciprocates back and forth, its motion will be imparted to its lower frame structure and cross bar 130. This draws the chain 132 back and forth, and as the chain is connected to the lower feeding carriage, it will also reciprocate. Note that the connection requires that the lower feeding carriage move in the opposite direction from the upper feeding carriage. I have shown the mechanism as having two chains, and it should be understood that any suitable number could be used.

In summary, the reciprocatory motion imparted to each carriage is acquired from the secondary drive shaft 116, and the intermittent motion is derived from the rotary motion of the drive shaft 100 through the over-center cranks 124. The chain mechanism 132 passing over the loosely mounted sprockets 134 effects the movement of the carriages in opposite directions.

The rails 88 which carry the upper carriage C2 are raised and lowered by oscillation of the crank lever 93 as stated before. This is effected through cam follower 94 shown in Figure 7.

In detail, the cam follower 94 carries a roller 138 which bears against a cam 140 mounted on the main drive shaft 100. The cam rotates clockwise and moves the cam follower 138 to the left to rotate the lever 93 clockwise. This movement raises the rails 88. When the cam follower falls off the rear edge of the cam 140, the reverse movement takes place and the rails are lowered.

Note that the lever 93 is mounted on the shaft 20. Consequently, rotation of these levers by the cam 140 also rocks the levers 24 and 26 and raises and lowers the lower feeding carriage C1.

The shaft 100 carries a lug 141 which engages a roller 142 to knock the actuating mechanism off of its top dead center position in the event it fails to automatically return.

In Figure 5, the arm 124 rotates clockwise, and during its idle period, it is positioned approximately horizontal. This represents the dwell or idle period when the untoothed portion of the mutilated gear is opposite the pinion 114. At this point, the carriages are approximately in the positions shown in Figure 9. The lever 124 in Figure 5 has just completed its upward movement. A locking lever 143 is uprightly positioned on the auxiliary platform 106 by a rod 144 with an enclosing spring 146, the rod being supported on a bracket 148 mounted generally upright on the auxiliary platform 106. The locking lever 143 is pivoted to the auxiliary platform by a suitable pivot connection 150.

As the lever 124 rotates clockwise upwardly to the position shown in Figure 5, a block 151 secured to the lever 124 will engage the spring-biased lever 143 and move it to the dotted line position. At the completion of the pallet-feeding operation, the lever 124 assumes the position shown in Figure 5, and due to gravity it will have a tendency to rotate back down to the vertical position but the lever 143 is spring-biased under it and prevents any unauthorized counter-rotation.

The use, operation and function of my invention are as follows:

My invention is a pallet-feeding device with two tracks, the lower track being slightly inclined with respect to the horizontal and being adapted to feed empty pallets from a supply stack to a molding station. The upper track is substantially horizontal and is above the lower track and is adapted to feed the pallets with the molded blocks on them away from the molding station. Each track is composed of at least two stationary rails with a pair of tracks which can be raised and lowered. A carriage mechanism is positioned on the rails and adapted to be raised and lowered by the movable tracks. The movable tracks rise above and fall below the upper edge of the stationary rails. Furthermore, the lower movable tracks carry rollers so that when they are raised above the stationary rails, the carriage will easily slide on them.

Through a mutilated gear and pinion connection, rotation from any suitable power source, and in this case the molding machine itself, imparts intermittent motion to the pallet-feeding mechanism. The device is timed with the operations of the molding machine so that when a molding operation is taking place, the pallet-feeding machine is not in operation, and the various carriages are in their normal position. When a molding operation has been completed, the lower carriage C1 is raised above the stationary rails by the movable tracks. It is moved forward by the chain mechanism shown in Figure 10. At the same time, the upper carriage C2 is also raised above its stationary rails by the mechanism shown in Figure 7, and the carriage is moved during its operative stroke by the over-center crank mechanism 124, as shown in Figure 1. Figure 10 shows both carriages at approximately the end of a feeding stroke or an operative stroke. Figure 9 shows both carriages in their normal position just after an inoperative or return stroke. During the return from the position shown in Figure 10 to the positions shown in Figure 9, the carriages will be dropped below the stationary rails by the raising and lowering mechanisms and will be returned to the normal positions by their actuating mechanism. As they are positioned below the stationary rails, they will not contact the pallets.

The auxiliary feeding mechanism shown in Figure 9 feeds the pallet one at a time from the supply stack SS by engagement with the lugs 62 and 64 on the chain. The driving mechanism is timed so that just prior to the depositing of the loaded pallets on the stationary rails 72 by the upper feeding carriage C2, at the end of an operative stroke, the lugs will engage the bottom pallet in the supply stack SS and begin moving it forward up the track UT. This relationship is clearly shown in Figure 10 where the bottom pallet has just begun its forward movement after it has been engaged by the lugs. Due to the frictional contact between the pallet being moved and the next pallet, a load is placed on the driving mechanism. Thus, instead of the entire load being taken off of the driving mechanism, as the loaded pallets on the upper track are deposited on the stationary rails by the carriage C2, a load is picked up just before the loaded pallets are put down, and no lurching or jumping will be encountered in the machine. If this relationship did not exist, as soon as the machine deposited the loaded pallets on the upper track, the entire load would be taken off of the driving mechanism, and the machine would have a tendency to lurch forward and vibrate. This would be very detrimental and result in the loss of a substantial number of the green blocks.

The driving mechanism shown in Figure 5 is timed with the movements of the carriages so that the crank 124 passes to the position shown in Figure 5 at approximately the same time that all loads are off of the machine and the carriages have returned to their normal position. At this point, the untoothed portion of the mutilated gear is opposite the pinion, and for the moment, the drive on the pallet-feeding device is discontinued. Gravity would normally draw the crank 124 down toward a vertical position in Figure 5, but in passing the horizontal, the crank 124 biased passed the lever 143, and as soon as the lever is released, it snaps into the position shown in Figure 5. This locking mechanism holds both carriages in their normal position and prevents the driving mechanism from unauthorized returning to a previous position of rotation.

The upper carriage UT moves with simple harmonic motion acquired from the cranks 124. This means that its horizontal components of movement will be smallest when it is loading and unloading, and largest during its feeding and return strokes.

While I have shown and described the preferred form of my invention, it should be understood that many modifications, alterations, changes, and substitutions can be made without departing from the invention's fundamental theme, and I wish that my invention be unrestricted except as by the appended claims.

I claim:

1. In a pallet-feeding mechanism wherein pallets are fed to and from a molding machine, with a molding station where blocks are molded on pallets as they are presented and removed from the molding station, the improvement including a frame, a pair of tracks mounted on the frame, one along which pallets are fed to, and the other along which pallets are fed from the molding station, a feeding carriage for each track, a driving mechanism for the carriages for intermittently reciprocating them at the same time including an over center crank, the driving mechanism being adapted to be connected to the drive of the molding machine, the driving mechanism having an active period and an inactive period, and a means for locking the driving mechanism against unauthorized movement during the inactive period.

2. In a pallet-feeding mechanism wherein pallets are fed to and from a molding machine, with a molding station where blocks are molded on pallets as they are presented and removed from the molding station, the improvement including a frame, a pair of tracks mounted on the frame, one track along which pallets are fed to, and the other track along which pallets are fed from the molding station, a feeding carriage for each track, a driving mechanism for the carriages for intermittently reciprocating both carriages at the same time including an over center crank, the driving mechanism having an active period and an inactive period, and a means for locking the driving mechanism against non-driving movement due to gravity on the over center crank during the inactive period.

3. A device for feeding pallets to and from a molding machine, including a generally horizontally disposed track, a pallet engaging mechanism movable along said track, driving means for moving said pallet engaging mechanism back and forth along the track, said driving means being adapted to be associated with the driving means of the molding machine to be driven thereby, said driving means including a crank arm for intermittently moving said pallet engaging mechanism and having an active and an inactive period, and means for locking the crank arm against unauthorized movement during its inactive period when it is not being operated.

4. In a pallet-feeding mechanism wherein pallets are fed to and from a molding mechanism, with a molding station where blocks are molded on pallets as they are consecutively presented and removed from the molding station, the improvement including a frame, a pair of tracks mounted on the frame, one track along which pallets are fed in to, and the other track along which pallets are fed out from the molding station, a feeding carriage for each track, one of the carriages being adapted to carry pallets to the molding station and the other being adapted to take the pallets away from the molding station, an auxiliary feeding mechanism at the end of the in-feed track remote from the molding station, a supply station at the end of the in-feed track remote from the molding station, the auxiliary feeding mechanism being adapted to feed pallets from the supply station along the in-feed track to the feeding carriage, a common drive for both carriages and the auxiliary feeding mechanism, and means for engaging and feeding a pallet from the supply station approximately at the same time that the loaded pallets on the out-feed track are unloaded from the carriage.

5. In a pallet feeding mechanism wherein pallets are fed to and from a molding machine, with a molding station where blocks are molded on pallets as they are consecutively presented and removed from the molding station, the improvement including a frame, a pair of tracks mounted on the frame, one track along which pallets are fed to and the other track along which pallets are fed from the molding station, a pallet engaging mechanism movable along each track, one such mechanism being adapted to carry pallets to the molding station and the other such mechanism being adapted to take pallets away from the molding station, an auxiliary feeding mechanism at the end of the infeed track remote from the molding station, a supply station at the end of the infeed track remote from the molding station, the auxiliary feeding mechanism being adapted to supply pallets from the supply station along the infeed track to the pallet engaging mechanism, and a common drive for the pallet engaging mechanism and the auxiliary feeding mechanism.

6. In a pallet-feeding mechanism wherein pallets are fed to and from a molding mechanism, with a molding station where blocks are molded on pallets as they are consecutively presented and removed from the molding station, the improvement including a frame, a pair of tracks mounted on the frame, one along which pallets are fed into, and the other along which pallets are fed out from the molding station, a feeding carriage for the out-feed track, and driving means for intermittently reciprocating the out-feed carriage to take loaded pallets away from the molding station at the same time that empty pallets are fed in along the in-feed track, said means including means for placing a load on the driving means just prior to the time that the load of loaded pallets is taken off of the out-feed carriage.

7. In a pallet-feeding mechanism wherein pallets are fed to and from a molding mechanism, with a molding station where blocks are molded on pallets as they are consecutively presented and removed from the molding station, the improvement including a frame, a pair of stationary tracks mounted on the frame, one along which pallets are fed in to, and the other along which pallets are fed out from the molding station, a feeding carriage for each track, the carriage on the infeed track being adapted to carry pallets to the molding machine and the carriage on the out-feed track being adapted to raise the loaded pallets above the stationary tracks away from the molding machine and carry them and deposit them on the stationary track again, an auxiliary feeding mechanism at the end of the in-feed track remote from the molding station, a supply station at the end of the in-feed track remote from the molding station, the auxiliary feeding mechanism being adapted to feed pallets from the supply station along the in-feed track to the feeding carriage, and means for engaging and feeding a pallet from the supply station no later than the time that the loaded pallets on the out-feed track are deposited on the stationary track by the carriage.

8. The structure of claim 5 further characterized by and including means for intermittently moving the pallet engaging mechanism providing an active and an inactive period, and means for continuously operating the auxiliary feeding mechanism.

9. The structure of claim 5 further characterized in that the infeed track extends through the auxiliary feeding mechanism.

References Cited in the file of this patent

UNITED STATES PATENTS

| | | |
|---|---|---|
| 1,340,824 | Crozier | May 18, 1920 |
| 2,496,016 | Nelson | Jan. 31, 1950 |